United States Patent
Lin

(10) Patent No.: US 12,395,790 B2
(45) Date of Patent: Aug. 19, 2025

(54) CIRCUIT OF NOVEL BUBBLE TOY

(71) Applicant: Huazun Lin, Shantou (CN)

(72) Inventor: Huazun Lin, Shantou (CN)

( * ) Notice: Subject to any disclaimer, the term of this patent is extended or adjusted under 35 U.S.C. 154(b) by 0 days.

(21) Appl. No.: 19/171,343

(22) Filed: Apr. 6, 2025

(65) Prior Publication Data
US 2025/0234128 A1   Jul. 17, 2025

(30) Foreign Application Priority Data
Apr. 8, 2024  (CN) ............ 20242070653.8

(51) Int. Cl.
*G06F 3/16* (2006.01)
*A63H 33/28* (2006.01)
*H04R 3/00* (2006.01)

(52) U.S. Cl.
CPC ............ *H04R 3/00* (2013.01); *A63H 33/28* (2013.01); *G06F 3/162* (2013.01); *G06F 3/167* (2013.01)

(58) Field of Classification Search
CPC .......... H04R 3/00; A63H 33/28; G06F 3/162; G06F 3/167
See application file for complete search history.

(56) References Cited

U.S. PATENT DOCUMENTS

| | | | | |
|---|---|---|---|---|
| 5,018,288 A | * | 5/1991 | Yang | A63H 33/28 40/406 |
| 2007/0207700 A1 | * | 9/2007 | Ellis | A63H 33/26 446/484 |
| 2013/0064143 A1 | | 3/2013 | Ryan et al. | |
| 2017/0279430 A1 | | 9/2017 | Qureshi | |
| 2021/0048983 A1 | | 2/2021 | Chang | |

FOREIGN PATENT DOCUMENTS

CN        209997207 U   *   1/2020

* cited by examiner

*Primary Examiner* — Joseph Saunders, Jr.
(74) *Attorney, Agent, or Firm* — Hemisphere Law, PLLC; Zhigang Ma

(57) ABSTRACT

A circuit of a novel bubble toy is provided, including a power module E, an execution module, a manual control module, a signal amplification module, and a voice source signal input module. The power module is a 4.5V direct current power source. The power module E includes a port VCC, a port GND, and a port MIC. In the designed circuit, controlling a motor through a switch is reserved. Meanwhile, a voice can be input to a microphone MIC, so that the motor can also be controlled to operate through the voice, thus achieving the same effect as controlling the motor through the switch. For a user, there is one more control mode and one more playing method.

6 Claims, 2 Drawing Sheets

CIRCUIT OF NOVEL BUBBLE TOY

TECHNICAL FIELD

The present disclosure relates to the technical field of children toys, and in particular, to a circuit of a novel bubble toy.

BACKGROUND

An electric bubble machine is a children toy designed based on an air pressure and the principle of an electric motor. The electric bubble machine mainly includes several parts such as a battery box, an electric motor, a ring for blowing bubbles, and a container. The container is filled with bubble water. The ring for blowing bubbles is dipped in the bubble water, and then a layer of bubble water film is formed in the middle of the ring. The battery box is a power source of the entire toy, to supply power to the electric motor. The electric motor generates power to drive the air in the middle of the ring for blowing bubbles to flow. Under a flow velocity and pressure of the air, the bubble water film is blown out, thus forming bubbles that can be seen.

In the existing electric bubble machine, its circuit control mode is that a power switch controls the motor to operate to produce bubbles. There is no voice control mode, so that a user can only press the switch with a hand to play with bubbles. Therefore, the user feels bored if there are few playing methods. The electric bubble machine has the monotonous playing method and lacks fun.

SUMMARY

The present disclosure aims to overcome the shortcomings in the prior art, and provides a circuit of a novel bubble toy.

In order to achieve the above objective, the present disclosure provides the following technical solutions:

A circuit of a novel bubble toy includes a power module E, an execution module, a manual control module, a signal amplification module, and a voice source signal input module. The power module is a 4.5V direct current power source. The power module E includes a port VCC, a port GND, and a port MIC.

The manual control module includes a microphone control switch S1, a capacitor C1, a capacitor C2, a diode D1, a manual control switch S2, and a microcontroller unit (MCU). The capacitor C1 and the capacitor C2 are connected in parallel to the port VCC and the port GND of the power module E. A first terminal and a second terminal of the MCU are connected to the port VCC and the port GND of the power module E. A fifth terminal of the MCU is a motor signal output terminal and is connected to a motor M1. A sixth terminal of the MCU is connected to a manual control switch S2. A fourth terminal of the MCU is connected to the diode D1.

The execution module includes the motor M1, a capacitor C3, a diode D2, a triode V1, a resistor R1, and a resistor R2; two connection ports of the triode V1 are respectively connected to the port VCC and the port GND of the power module E. The motor M1 is connected in series with the triode V1. The motor M1, the capacitor C3, and the diode D2 are connected in parallel. A third port of the triode V1 is connected to the resistor R1 and the resistor R2. The resistor R2 is connected to the fifth terminal of the MCU. Another end of the resistor R1 is connected to the port GND of the power module E.

The voice source signal input module includes a resistor R3, a resistor R6, a resistor R7, a resistor R14, a capacitor C4, a capacitor C5, a capacitor C6, a capacitor C7, a capacitor C8, a capacitor C9, and a microphone MIC. The resistor R6 is respectively connected in series with the capacitor C6, the capacitor C7, the capacitor C8, the capacitor C9, the resistor R7, and the microphone MIC to the port MIC and the port GND of the power module E. The capacitor C6, the capacitor C7, the capacitor C8, the microphone MIC, and the resistor R7 are connected in parallel. The resistor R7 is connected in series with the capacitor C9. The resistor R6 is connected in series with the resistor R3. The resistor R6 is connected in series with the resistor R14. The resistor R14 is connected in parallel with the capacitor C7. The resistor R3 is connected in parallel with the resistor R7. The resistor R3 is connected to the capacitor C4 and the capacitor C5. The capacitor C4 and the capacitor C5 are connected in parallel with each other.

The signal amplification module includes a resistor R4, a resistor R5, a resistor R8, a resistor R9, a resistor R10, a resistor R11, a resistor R12, a resistor R13, a capacitor C10, a capacitor C11, a triode V2, and a triode V3. The resistor R4 is connected to the resistor R3. The resistor R4 is connected to the resistor R5 and the resistor R8. The resistor R8, the resistor R10, and the resistor R11 are connected in parallel with each other. The resistor R11 is connected to an eighth terminal of the MCU. The resistor R11 is connected to a first terminal of the triode V3. A second terminal of the triode V3 is connected to the capacitor C10 and the resistor R10. The capacitor C10 is connected in parallel with the resistor R10. The capacitor C10 is connected in series with the resistor R9. The resistor R9 is connected in parallel to the resistor R8. The resistor R9 and the resistor R8 are a first terminal of the triode V2. A second terminal of the triode V2 is connected to the resistor R5. A third terminal of the triode V2 is connected to the resistor R12; the resistor R12 is connected to the resistor R13. The resistor R13 is connected in parallel with the capacitor C11 and is connected to the third terminal of the triode V3. The third terminal of the triode V3 is connected to the resistor R5. Preferably, the diode D1 is an orange light-emitting diode.

Preferably, in the manual control module, the capacitor C1 is a 100-microfarad capacitor; the capacitor C2 is a 104 capacitor; and the MCU is a PFS122 microcontroller unit.

Preferably, in the execution module, the resistor R1 is a 10K resistor; the triode V1 is an 8050NPN transistor; the capacitor C3 is a 104 capacitor; and the diode D2 is a 5819 diode.

Preferably, in the voice source signal input module, the resistor R3 is a 330 R resistor; the capacitor C4 is a 106 P capacitor; the capacitor C5 is a 104 P capacitor; the capacitor C6 is a 100-microfarad capacitor; the capacitor C7 is a 104 capacitor; the capacitor C9 is a 104 capacitor; the resistor R6 is a 100 R resistor; the resistor R14 is a 4.7K resistor; and the resistor R7 is a 10K resistor.

Preferably, in the signal amplification module, the resistor R4 is a 3.3K resistor; the resistor R5 is a 7.5K resistor; the resistor R8 is a 3.3K resistor; the resistor R9 is a 470R resistor; the resistor R10 is a 1M resistor; the resistor R11 is a 4.7K resistor; the resistor R12 is a 47 R resistor; the resistor R13 is a 470 R resistor; the capacitor C10 is a 104 capacitor; and both the triode V2 and the triode V3 are NPN transistors.

The present disclosure has the following beneficial effects:

In the designed circuit, controlling a motor through a switch is reserved. Meanwhile, a voice can be input to a microphone MIC, so that the motor can also be controlled to operate through the voice, thus achieving the same effect as controlling the motor through the switch. For a user, there is one more control mode and one more playing method.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments.

Figure 1:
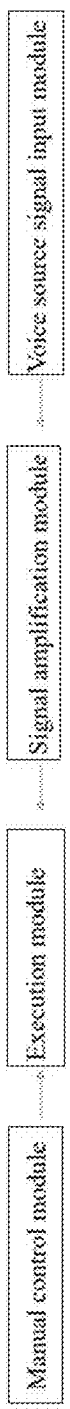
FIG. 1 is a schematic diagram of logic control of a circuit of a novel bubble toy according to the present disclosure.
Figure 2:
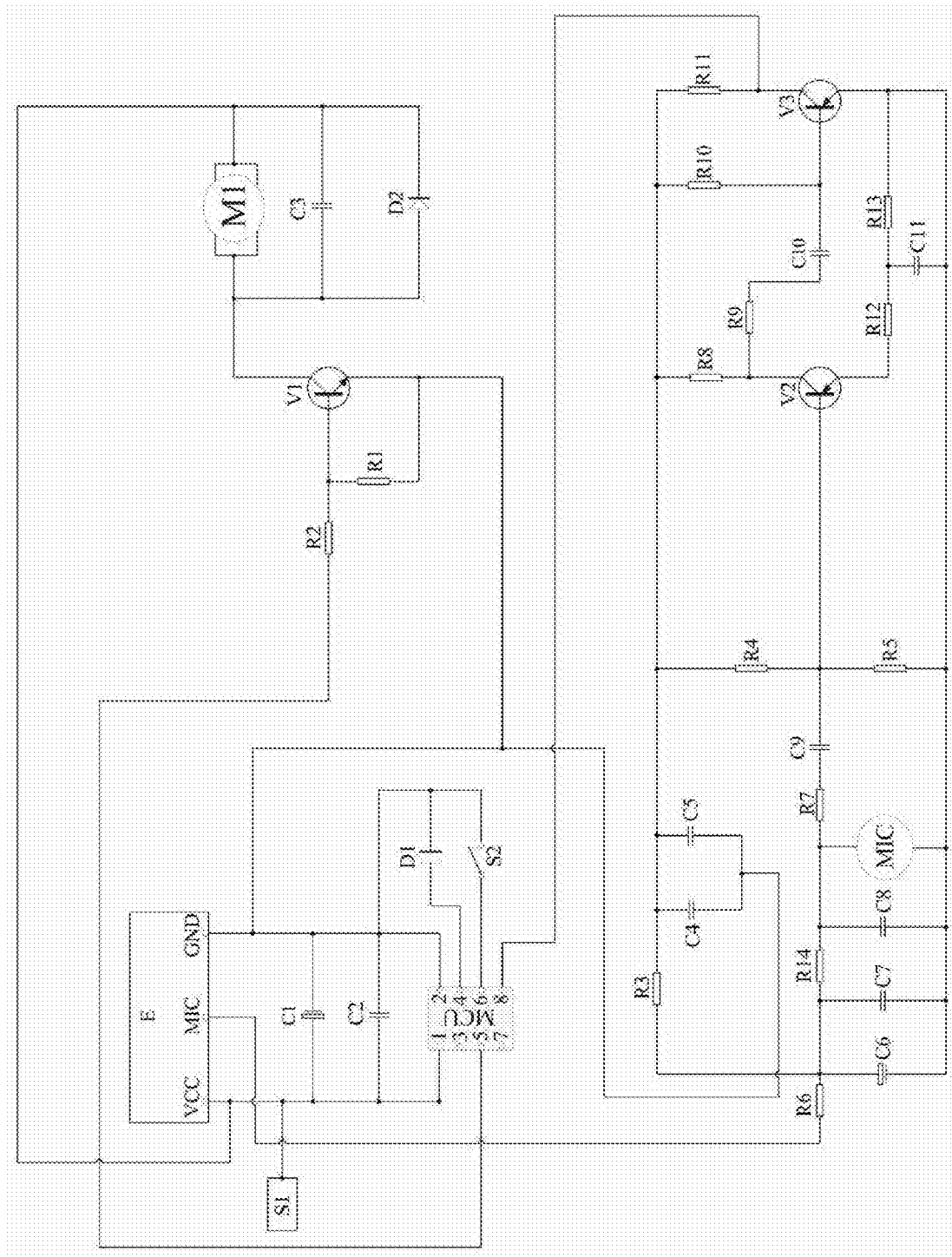
FIG. 2 is a circuit diagram of a circuit of a novel bubble toy according to the present disclosure.

Referring to FIG. 1 to FIG. 2, a circuit of a novel bubble toy includes a power module E, an execution module, a manual control module, a signal amplification module, and a voice source signal input module. The power module is a 4.5V direct current power source; the power module E includes a port VCC, a port GND, and a port MIC.

The manual control module includes a microphone control switch S1, a capacitor C1, a capacitor C2, a diode D1, a manual control switch S2, and a microcontroller unit (MCU). The capacitor C1 and the capacitor C2 are connected in parallel to the port VCC and the port GND of the power module E. A first terminal and a second terminal of the MCU are connected to the port VCC and the port GND of the power module E. A fifth terminal of the MCU is a motor signal output terminal and is connected to a motor M1. A sixth terminal of the MCU is connected to a manual control switch S2. A fourth terminal of the MCU is connected to the diode D1.

When manual operation is needed, the microphone control switch S1 is opened; the microphone control switch S1 then sends an electrical signal to the MCU. The MCU cuts off power of the microphone MIC, thus turning off the microphone MIC. In this case, a manual mode is activated. The manual control switch S2 is closed. The manual control switch S2 transmits a signal to the MCU. The MCU controls the motor M1 to operate, thus completing bubble blowing.

The execution module includes the motor M1, a capacitor C3, a diode D2, a triode V1, a resistor R1, and a resistor R2; two connection ports of the triode V1 are respectively connected to the port VCC and the port GND of the power module E. The motor M1 is connected in series with the triode V1. The motor M1, the capacitor C3, and the diode D2 are connected in parallel. A third port of the triode V1 is connected to the resistor R1 and the R2. The resistor R2 is connected to the fifth terminal of the MCU. Another end of the resistor R1 is connected to the port GND of the power module E.

The voice source signal input module includes a resistor R3, a resistor R6, a resistor R7, a resistor R14, a capacitor C4, a capacitor C5, a capacitor C6, a capacitor C7, a capacitor C8, a capacitor C9, and a microphone MIC. The resistor R6 is respectively connected in series with the capacitor C6, the capacitor C7, the capacitor C8, the capacitor C9, the resistor R7, and the microphone MIC to the port MIC and the port GND of the power module E. The capacitor C6, the capacitor C7, the capacitor C8, the microphone MIC, and the resistor R7 are connected in parallel. The resistor R7 is connected in series with the capacitor C9. The resistor R6 is connected in series with the resistor R3. The resistor R6 is connected in series with the resistor R14. The resistor R14 is connected in parallel with the capacitor C7. The resistor R3 is connected in parallel with the resistor R7. The resistor R3 is connected to the capacitor C4 and the capacitor C5. The capacitor C4 and the capacitor C5 are connected in parallel with each other.

After the microphone control switch S1 is closed, a voice is input to the microphone MIC. The microphone MIC performs analog conversion on a voice signal into an electrical signal, and voltage fluctuation or interference are filtered out through a filtering effect off the capacitors.

The signal amplification module includes a resistor R4, a resistor R5, a resistor R8, a resistor R9, a resistor R10, a resistor R11, a resistor R12, a resistor R13, a capacitor C10, a capacitor C11, a triode V2, and a triode V3. The resistor R4 is connected to the resistor R3. The resistor R4 is connected to the resistor R5 and the resistor R8. The resistor R8, the resistor R10, and the resistor R11 are connected in parallel with each other. The resistor R11 is connected to an eighth terminal of the MCU. The resistor R11 is connected to a first terminal of the triode V3. A second terminal of the triode V3 is connected to the capacitor C10 and the resistor R10. The capacitor C10 is connected in parallel with the resistor R10. The capacitor C10 is connected in series with the resistor R9. The resistor R9 is connected in parallel to the resistor R8. The resistor R9 and the resistor R8 are a first terminal of the triode V2. A second terminal of the triode V2 is connected to the resistor R5. A third terminal of the triode V2 is connected to the resistor R12; the resistor R12 is connected to the resistor R13. The resistor R13 is connected in parallel with the capacitor C11 and is connected to the third terminal of the triode V3. The third terminal of the triode V3 is connected to the resistor R5.

Current is amplified under the actions of both the triode V2 and the triode V3, and a signal is input to the MCU. The MCU controls the motor M1 to operate.

In the present disclosure, the diode D1 is an orange light-emitting diode.

In the present disclosure, in the manual control module, the capacitor C1 is a 100-microfarad capacitor; the capacitor C2 is a 104 capacitor; and the MCU is a PFS122 microcontroller unit.

In the present disclosure, in the execution module, the resistor R1 is a 10K resistor; the triode V1 is an 8050 NPN transistor; the capacitor C3 is a 104 capacitor; and the diode D2 is a 5819 diode.

In the present disclosure, in the voice source signal input module, the resistor R3 is a 330 R resistor; the capacitor C4 is a 106 P capacitor; the capacitor C5 is a 104 P capacitor; the capacitor C6 is a 100-microfarad capacitor; the capacitor C7 is a 104 capacitor; the capacitor C9 is a 104 capacitor; the resistor R6 is a 100 R resistor; the resistor R14 is a 4.7K resistor; and the resistor R7 is a 10K resistor.

In the present disclosure, in the signal amplification module, the resistor R4 is a 3.3K resistor; the resistor R5 is a 7.5K resistor; the resistor R8 is a 3.3K resistor; the resistor R9 is a 470 R resistor; the resistor R10 is a 1M resistor; the resistor R11 is a 4.7K resistor; the resistor R12 is a 47 R resistor; the resistor R13 is a 470 R resistor; the capacitor C10 is a 104 capacitor; and both the triode V2 and the triode V3 are NPN transistors.

During use, by closing or opening the microphone control switch S1 to switch between a voice control mode and a manual control mode, when the microphone control switch S1 is closed, the voice control mode is activated. In this case, a voice source is input to the microphone MIC, and the microphone MIC converts a voice signal into an electrical signal. After filtering and voltage stabilization of the circuit, the current is transmitted to the signal amplification module. Through current amplification effects of both the triode V2 and the triode V3, the signal is transmitted to the MCU which controls the motor M1 to operate, thereby achieving an execution action of an execution mechanism. When the microphone control switch S1 is opened, the manual control mode is activated. In this case, the motor M1 is controlled to operate by the manual control switch S2, thereby achieving an action of the execution mechanism.

The above is only the specific implementation of the present disclosure, but the protection scope of the present disclosure is not limited to this. Equivalent replacements or changes made by any person skilled in the art within the technical scope disclosed in the present disclosure based on the technical solutions and concept of the present disclosure shall all fall within the protection scope of the present disclosure.

What is claimed is:

1. A circuit of a novel bubble toy, comprising a power module E, an execution module, a manual control module, a signal amplification module, and a voice source signal input module, wherein the power module is a 4.5V direct current power source; the power module E comprises a port VCC, a port GND, and a port MIC;

the manual control module comprises a microphone control switch (S1), a capacitor (C1), a capacitor (C2), a diode (D1), a manual control switch (S2), and a microcontroller unit (MCU); the capacitor (C1) and the capacitor (C2) are connected in parallel with the port VCC and the port GND of the power module E; a first terminal and a second terminal of the MCU are connected to the port VCC and the port GND of the power module E; a fifth terminal of the MCU is a motor signal output terminal and is connected to a motor (M1); a sixth terminal of the MCU is connected to a manual control switch (S2); a fourth terminal of the MCU is connected to the diode (D1);

the execution module comprises the motor (M1), a capacitor (C3), a diode (D2), a triode (V1), a resistor (R1), and a resistor (R2); two connection ports of the triode (V1) are respectively connected to the port VCC and the port GND of the power module E; the motor (M1) is connected in series with the triode (V1); the motor (M1), the capacitor (C3), and the diode (D2) are connected in parallel; a third port of the triode (V1) is connected to the resistor (R1) and the (R2); the resistor (R2) is connected to the fifth terminal of the MCU; another end of the resistor (R1) is connected to the port GND of the power module E;

the voice source signal input module comprises a resistor (R3), a resistor (R6), a resistor (R7), a resistor (R14), a capacitor (C4), a capacitor (C5), a capacitor (C6), a capacitor (C7), a capacitor (C8), a capacitor (C9), and a microphone MIC; the resistor (R6) is respectively connected in series with the capacitor (C6), the capacitor (C7), the capacitor (C8), the capacitor (C9), the resistor (R7), and the microphone MIC to the port MIC and the port GND of the power module E; the capacitor (C6), the capacitor (C7), the capacitor (C8), the microphone MIC, and the resistor (R7) are connected in parallel; the resistor (R7) is connected in series with the capacitor (C9); the resistor (R6) is connected in series with the resistor (R3); the resistor (R6) is connected in series with the resistor (R14); the resistor (R14) is connected in parallel with the capacitor (C7); the resistor (R3) is connected in parallel with the resistor (R7); the resistor (R3) is connected to the capacitor (C4) and the capacitor (C5); the capacitor (C4) and the capacitor (C5) are connected in parallel with each other;

the signal amplification module comprises a resistor (R4), a resistor (R5), a resistor (R8), a resistor (R9), a resistor (R10), a resistor (R11), a resistor (R12), a resistor (R13), a capacitor (C10), a capacitor (C11), a triode (V2), and a triode (V3); the resistor (R4) is connected to the resistor (R3); the resistor (R4) is connected to the resistor (R5) and the resistor (R8); the resistor (R8), the resistor (R10), and the resistor (R11) are connected in parallel with each other; the resistor (R11) is connected to an eighth terminal of the MCU; the resistor (R11) is connected to a first terminal of the triode (V3); a second terminal of the triode (V3) is connected to the capacitor (C10) and the resistor (R10); the capacitor (C10) is connected in parallel with the resistor (R10); the capacitor (C10) is connected in series with the resistor (R9); the resistor (R9) is connected in parallel to the resistor (R8); the resistor (R9) and the resistor (R8) are a first terminal of the triode (V2); a second terminal of the triode (V2) is connected to the resistor (R5); a third terminal of the triode (V2) is connected to the resistor (R12); the resistor (R12) is connected to the resistor (R13); the resistor (R13) is connected in parallel with the capacitor (C11) and is connected to the third terminal of the triode (V3); and the third terminal of the triode (V3) is connected to the resistor (R5).

2. The circuit of the novel bubble toy according to claim 1, wherein the diode (D1) is an orange light-emitting diode.

3. The circuit of the novel bubble toy according to claim 1, wherein in the manual control module, the capacitor (C1) is a 100-microfarad capacitor; the capacitor (C2) is a 104 capacitor; and the MCU is a PFS122 microcontroller unit.

4. The circuit of the novel bubble toy according to claim 1, wherein in the execution module, the resistor (R1) is a 10K resistor; the triode (V1) is an 8050NPN transistor; the capacitor (C3) is a 104 capacitor; and the diode (D2) is a 5819 diode.

5. The circuit of the novel bubble toy according to claim 1, wherein in the voice source signal input module, the resistor (R3) is a 330 R resistor; the capacitor (C4) is a 106P capacitor; the capacitor (C5) is a 104 P capacitor; the capacitor (C6) is a 100-microfarad capacitor; the capacitor (C7) is a 104 capacitor; the capacitor (C9) is a 104 capacitor; the resistor (R6) is a 100 R resistor; the resistor (R14) is a 4.7K resistor; and the resistor (R7) is a 10K resistor.

6. The circuit of the novel bubble toy according to claim 1, wherein in the signal amplification module, the resistor (R4) is a 3.3K resistor; the resistor (R5) is a 7.5K resistor; the resistor (R8) is a 3.3K resistor; the resistor (R9) is a 470 R resistor; the resistor (R10) is a 1M resistor; the resistor (R11) is a 4.7K resistor; the resistor (R12) is a 47 R resistor; the resistor (R13) is a 470 R resistor; the capacitor (C10) is a 104 capacitor; and both the triode (V2) and the triode (V3) are NPN transistors.

* * * * *